United States Patent
Warnshuis et al.

(10) Patent No.: US 9,593,022 B2
(45) Date of Patent: Mar. 14, 2017

(54) COLLOIDAL SOL AND METHOD OF MAKING SAME

(71) Applicant: SILBOND CORPORATION, Weston, MI (US)

(72) Inventors: Kenneth Warnshuis, Adrian, MI (US); George Haag, Manitou Beach, MI (US); Peter Rau, Morenci, MI (US); Keith Hirsch, Canton, MI (US)

(73) Assignee: Silbond Corporation, Weston, MI (US)

( * ) Notice: Subject to any disclaimer, the term of this patent is extended or adjusted under 35 U.S.C. 154(b) by 172 days.

(21) Appl. No.: 14/255,447

(22) Filed: Apr. 17, 2014

(65) Prior Publication Data

US 2014/0312264 A1    Oct. 23, 2014

Related U.S. Application Data

(60) Provisional application No. 61/812,936, filed on Apr. 17, 2013.

(51) Int. Cl.
*C09K 13/06* (2006.01)
*C01B 33/141* (2006.01)
*C09G 1/02* (2006.01)

(52) U.S. Cl.
CPC ........ *C01B 33/141* (2013.01); *C01B 33/1415* (2013.01); *C09G 1/02* (2013.01)

(58) Field of Classification Search
CPC .......... C09G 1/00; C09G 1/02; C09K 3/1454; C01B 33/141; C01B 33/1415
USPC ................... 252/79.1, 79.5; 438/693; 51/308
See application file for complete search history.

(56) References Cited

U.S. PATENT DOCUMENTS

| | | | |
|---|---|---|---|
| 6,334,880 B1 | 1/2002 | Negrych et al. | |
| 8,053,479 B2 | 11/2011 | Masuda et al. | |
| 8,961,677 B2 | 2/2015 | Magee, Jr. et al. | |
| 2003/0061766 A1* | 4/2003 | Vogt .................. | C09G 1/02 51/308 |
| 2006/0255015 A1* | 11/2006 | Siddiqui ............... | B24B 37/044 216/88 |
| 2008/0086951 A1* | 4/2008 | Wakamiya ............. | C01B 33/14 51/308 |
| 2010/0071272 A1* | 3/2010 | Higuchi ................ | C01B 33/141 51/308 |
| 2011/0209413 A1* | 9/2011 | Nishida .................. | C01B 33/14 51/308 |
| 2013/0145964 A1 | 6/2013 | Barth et al. | |

FOREIGN PATENT DOCUMENTS

TW    250570 B    3/2006

OTHER PUBLICATIONS

Stober et al., Controlled Growth of Monodisperse Silica Spheres in the Micron Size Range, Journal of Colloid and Interface Science, pp. 62-69, vol. 26, Jan. 1968.
Iler, R. K., The Chemistry of Silica: Solubility, Polymerization, Colloid and Surface Properties, and Biochemistry, pp. 364-399, John Wiley & Sons, ISBN 0-471-02404-X, 1979.

* cited by examiner

*Primary Examiner* — Binh X Tran
(74) *Attorney, Agent, or Firm* — Jason S. Ngui; Linda S. Li; Bernard Lau

(57) ABSTRACT

A colloidal sol and a method of making colloidal sol that is capable of controlling the resulting particle size and more specifically, using a potassium hydroxide process to obtain a colloidal sol having a single peak of average particle sizes.

36 Claims, 2 Drawing Sheets

COLLOIDAL SOL AND METHOD OF MAKING SAME

CROSS-REFERENCE TO PRIOR APPLICATIONS

This U.S. patent application claims the benefit of U.S. Provisional Patent Application Ser. No. 61/812,936 filed Apr. 17, 2013, entitled "Colloidal Sol And Method Of Making Same," the entire disclosure of the application being considered part of the disclosure of this application and hereby incorporated by reference.

FIELD OF THE INVENTION

The present invention is directed to a colloidal sol and a method of making colloidal sol that is capable of controlling the resulting particle size and more specifically to a method that uses a potassium hydroxide process to obtain a high-purity colloidal sol having a single peak of average particle distribution sizes.

BACKGROUND FOR THE INVENTION

A number of processes are possible for making colloidal sol, however, most of these processes result in particle sizes that have multiple peaks creating a wide disparity of particle sizes. Currently, there is a high demand for high-purity colloidal sol containing few impurities for various uses, particularly in the electronics industry. Colloidal sol may be used for a variety of processes including final polishing of wafers, such as silicon wafers for semiconductor devices, because high-purity colloidal sol does not contaminate the silicon wafers. A colloidal sol with small silica particles has a high precision capability of polishing materials that are required to be scratch-free and microstructural. Thus, a highly concentrated colloidal sol with generally consistent single sized peak distribution of small silica particles, wherein the size of the silica particles is precisely controlled is needed. Current methods of making a colloidal sol create as different sized particles, which provide different polishing properties, and most colloidal sol has at least two peak distributions of particle sizes, as illustrated in FIG. 1. More specifically, colloidal sol having known particle sizes is desirable because the polishing characteristics of the colloidal sol may be repeatedly used in polishing high precision silicon wafers, with consistent results.

While a number of processes exist for producing colloidal sol, most of them have three major problems. The first problem, as stated above, is that most colloidal sols result in multiple particle size peak distributions, i.e., the particle sizes when graphed for intensity versus size, as illustrated in FIG. 1, include at least two peaks, such that typically at least two large peaks of particle sizes occur. Also, as illustrated in FIG. 1, most current methods create one peak for larger particles and one peak for smaller particles with one peak being larger than the other peak. While these dual-peak particle size compositions may be repeatedly made, which allows some consistency in polishing, they are not as desirable as single-peak particle size composition for use in polishing. Even if a single peak size distribution is obtained for current silica sols, the center point of the size distribution peak varies from batch to batch with the current silica sols at best being able to obtain a size of ±10 nm, which for 50-70 nm particles (a common size) is up to a 20% variance in sizes, which creates substantially different performance characteristics.

Second, the size of the particles is typically controlled to provide desired polishing characteristics; however, many of the processes for controlling particle size of colloidal sol use ingredients that are considered impurities when used in combination with semiconductor devices. As such, these processes are not desirable for colloidal sols that are to be used with semiconductor devices. Trace metals may also cause undesirable and variable polishing characteristics.

Third, most colloidal sol products have the tendency to grow in particle size with time, which creates unexpected polishing characteristics. The rate of growth may vary inconsistently depending on storage and transportation conditions, and time since manufacture, which causes inconsistencies in polishing characteristics for even colloidal sols of the same composition and even sometimes from the same batch. Therefore, all factors from storage to transportation to storage at the end use facility must be strictly controlled to ensure consistent quality, which is very expensive. In addition, it is difficult to order large quantities and store such quantities use and draw out of storage over a time period due to the tendency of the particles to grow in size with time. Further, many of the attempts to control particle size and reduce growth characteristics after manufacture of the colloidal sol, increase the viscosity of the colloidal sol which reduces the ability of the colloidal sol to effectively polish semiconductors.

Other issues do exist with most silica sols that are currently available. Many silica sols include sodium, which is considered an undesirable impurity for many uses in the electronics industry. Many silica sols also require a narrow range of specific storage and transportation temperatures so that the quality of the sol is not degraded. Current sols experience quality issues when the temperature falls below 5° C., and the silica sol should not be allowed to freeze. These temperature limitations may require heated or cooled transportation, which is difficult or expensive.

In view of the above problems, this invention provides a high-purity, highly concentrated colloidal sol with long-term stability, long-term particle size stability and low viscosity, allowing for long-term storage after production and consistent performance characteristics. The invention also provides the ability to control particle size to be predominately a single peak of particle sizes, thereby allowing products of exceptional polishing properties for the semiconductor industry.

SUMMARY OF THE INVENTION

Figure 1:
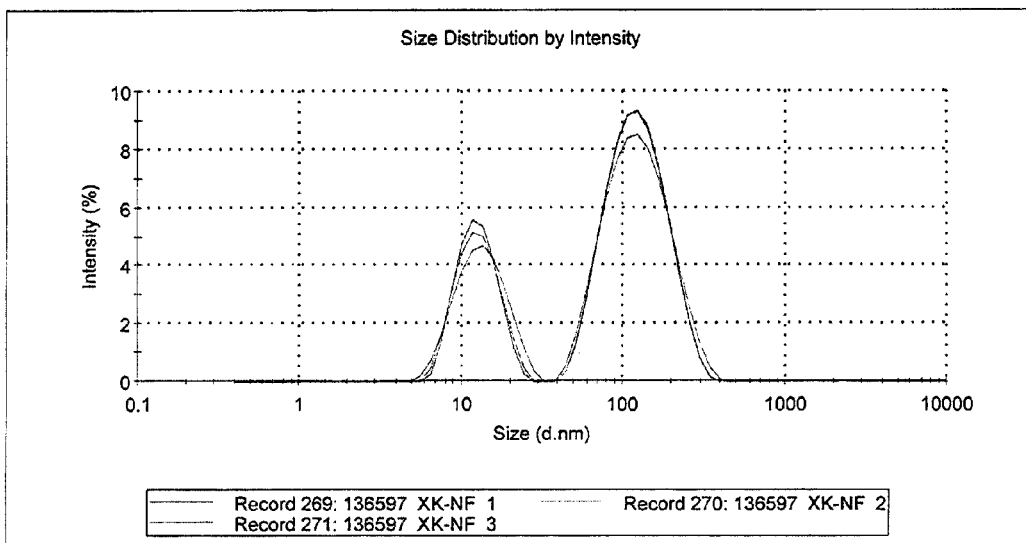
FIG. 1 is a plot showing dual peaks of particle size before the adjusting step.

The present invention is directed to a colloidal sol and a method of making colloidal sol that is capable of controlling the resulting particle size and more specifically to a method that uses a potassium hydroxide process to obtain a high-purity colloidal sol having a single peak of average particle distribution sizes.

The present invention further relates to a method of producing a silica sol material, having the steps of: (1) hydrolyzing a silica source, such as at least one of TMOS and TEOS to create a silica sol; (2) distilling the silica sol to remove at least one of methanol, ethanol and water; and adjusting the particle size to create a single size distribution peak through adjusting the pH of the silica sol from a base to an acid and back to a base. The silica sol is in a KOH solution.

The step of hydrolyzing occurs at a pH of at least 9.0, typically about 9.0 to 11, preferably 9.5 to 10.5, more preferably 9.6-10.4, and more preferably about 10.0, with most examples illustrated below occurring at 10.0. The step of adjusting the pH lowers the pH to less than 7.0 or to an acid from a base, typically 6.0-7.0, preferably 6.2-6.9, more preferably 6.4-6.8 or about 6.6 and in the illustrated examples to 6.6. The silica sol is then raised in pH from an acid back to a base, typically to the same pH as before, such as back to at least at least 9.0, typically about 9.0 to 11, preferably 9.5 to 10.5, more preferably 9.6-10.4, and more preferably about 10.0, with most examples illustrated below occurring at 10.0.

The step of adjusting the pH to an acid is generally done with an acid, preferably an organic acid and as illustrated in the examples with a citric acid. To allow ease of addition the acid is at a similar concentration as the later added base, such as a 10% acid is added until the silica sol is acidic and then a 10% KOH solution is used added to the solution until the silica sol is basic.

The step of hydrolyzing includes adding KOH and the step of adjusting the particle size to create a single size distribution peak through adjusting the pH of the silica sol from a base to an acid and back to a base includes the steps of adding citric acid to turn the silica sol to an acid and then adding KOH to turn the silica sol to a base.

The step of hydrolyzing a silica source, such as at least one of TMOS and TEOS to create a silica sol further includes the steps of: (1) adding water to a reactor; (2) adding tetramethylammonium hydroxide to the reactor; (3) adding KOH to the reactor; (4) mixing the water, tetramethylammonium hydroxide and KOH; and (5) adding at least one of TEOS and TMOS to the reactor for a specified time period, such as at least 170 minutes, preferably 175-185, and more preferably about 180 minutes, and maintaining the reactor at a reflux condition, typically the boiling point plus at least two degrees, typically up to ten degrees, preferably up to five degrees, for the solvent or the created alcohol, such as the created ethanol. If TEOS is used or ethanol is used as a solvent the reactor may be maintained to a reflux condition at 75-83 degrees C.

The step of hydrolyzing a silica source, such as at least one of TMOS and TEOS to create a silica sol further includes the step of adding monoethanolamine to the reactor after said step of adding a silica source, such as at least one of TEOS and TMOS to the reactor.

The step of hydrolyzing at least one of TMOS and TEOS to create a silica sol further includes the steps of: (1) adding water to a reactor; (2) adding a solvent, such as ethanol to the reactor; (3) adding tetramethylammonium hydroxide to the reactor; (4) adding KOH to the reactor; (5) mixing the water, the solvent, such as ethanol, tetramethylammonium hydroxide and KOH; and (6) adding at least one of the silica source, such as TEOS and TMOS to the reactor over 175-185 minutes and maintaining the reactor in a reflux condition for the solvent, such as ethanol, and for ethanol maintaining the reactor at 78-83 degrees C.

The step of distilling includes the steps of: (1) increasing the temperature to create a reflux condition in a reactor; (2) atmospheric stripping to a column head temperature of about 95 degrees C.; (3) cooling the reactor; (4) establishing a vacuum of 610-660 mm of Hg; (5) heating the reactor after establishing a vacuum until a reflux condition is created; and (6) strip under vacuum.

The step of adjusting the particle size to create a single size distribution peak through adjusting the pH of the silica sol from a base to an acid and back to a base further includes the steps of: (1) adding 10% citric acid until reaching a pH of about 6.6; circulating the silica sol; adding 10% KOH until reaching a pH of about 10.0; and circulating the silica sol.

The method may further including the step of adding hydrogen peroxide after said step of adjusting the particle size to create a single size distribution peak through adjusting the pH of the silica sol from a base to an acid and back to a base.

The method may further including the step of discharging the silica sol from a reactor into containers through at least one of 5 micron, 3 micron, 1 micron and 0.5 micron filters.

The present invention is further directed to a method of producing a silica sol material, said method comprising the steps of: (1) hydrolyzing a silica source to create a silica sol in a solution of KOH, wherein said silica source is a tetraalkyl orthosilicate, and at a pH of at least 9.0; (2) distilling the silica sol to remove at least one of a solvent and water; and (3) adjusting the particle size to create a single size distribution peak through adjusting the pH of the silica sol from a base to an acid and back to a base.

The step of hydrolyzing generally occurs at a pH of about 9.5 to 10.5 and wherein said step adjusting lowers the pH to about 6.6 and then raises the pH to about 9.5 to 10.5.

The step of adjusting the particle size through adjusting the pH of the silica sol includes adding an organic acid to the silica sol, and wherein said solvent is selected from the group consisting of methanol, ethanol, propanol, isopropanol, butanol, and pentanol, and said organic acid is selected from the group consisting of succinic acid, tartaric acid, phthalic acid, acetic acid, citric acid, and maleic acid.

The step of hydrolyzing a silica source to create a silica sol in a solution of KOH further includes the steps of: (1) adding water to a reactor; (2) adding said solvent to the reactor; (3) adding tetramethylammonium hydroxide to the reactor; (4) adding KOH to the reactor; (5) mixing the water, ethanol, tetramethylammonium hydroxide and KOH; and (6) adding said silica source to the reactor over 170-190 minutes and maintaining the reactor in a reflux condition for said solvent. The inventors have noted that 60-300 minutes works for the addition of the silica source to the reactor, preferably 120-240 minutes, more preferably 150-200 minutes and even more preferably 160-190 minutes. The 170-190 minutes of addition time is within the range and the best range the inventors have found is 175-185 minutes, with the examples using 180 minutes for addition of the silica source to the reactor.

The step of adjusting the particle size to create a single size distribution peak through adjusting the pH of the silica sol from a base to an acid and back to a base further includes the steps of: (1) adding 10% citric acid until reaching a pH of about 6.6; (2) circulating the silica sol; (3) adding 10% KOH until reaching a pH of about 10.0; and (4) circulating the silica sol.

The tetraalkyl orthosilicate is generally selected from the group of Tetrapropyl orthosilicate (TPOS), Tetraisopropyl orthosilicate (TiPOS), Tetrabutyl orthosilicate (TBOS), tetraethyl orthosilicate (TEOS) and Tetramethyl orthosilicate (TMOS).

The method step of hydrolyzing a silica source to create a silica sol in a solution of KOH further includes the step of adding said silica source to the reactor over 60-300 minutes, preferably 120-240 minutes, more preferably, 150-200 minutes, even more preferably 160-190 minutes, and yet more preferably 170-190 minutes, with the examples with TEOS having an addition time of 175-185, typically about 180 minutes.

The method step of distilling the silica sol to remove at least one of a solvent and water further includes the step of atmospheric stripping to a column head temperature of 15-20 degrees C. above the boiling point of said solvent. The solvent may be created alcohol solvent and/or intentionally added alcohol solvent. During the distillation process, the step of distilling the silica sol to remove at least one of a solvent and water is performed until less than 1% by weight of said solvent of said total weight of silica sol remains, preferably less than 0.5%, more preferably less than 0.3% and yet more preferably less than 0.1%, with the examples in the detailed description being able to be less than 0.05%, typically less than 0.03% and even below 0.01%.

DETAILED DESCRIPTION

The present invention is directed to a colloidal sol and method of making the same. The colloidal sol is generally a silica sol in a potassium hydroxide (KOH) solution at about a pH of 10 with the particle size of the silica sol being in the 1-nanometer to 5,000-micron range, typically in the 10-500-nanometer range, more typically in the 15-250-nanometer range. Exemplary processes to make 210 nm, 310 nm, and 450 nm particles are provided below. As used in this application, the term about or approximately when used with the pH of a solution means±0.5 pH, preferably ±0.2 pH and more preferably ±0.1 pH.

The inventors have found that a pH of 10 is preferable for extended product shelf life, but lower pH values may be used. However, as the pH lowers from a pH of 10, the silica particles become unstable and flocculation and agglomeration of the silica particles may occur. As the pH increases from a pH of 10, the silica particles begin to dissolve or shrink. Stability of the silica sol is also affected by $SiO_2$ concentration, particle size, storage temperature, transportation temperature, and other factors.

Generally, the terms about and approximately are used to account for minor process variations that one skilled in the art would recognize as not effecting or having a minimal effect on the desired process. As the particles of silica suspended in the colloidal sol resulting from the process of the present invention may have variation in shape from spheres, which is preferable for polishing, the particle size as illustrated in the Figures is measured with a diameter and width, with the diameter being the largest of the two numbers and the diameter is number used in this application as the size of the particle. In fact, the present invention produces excellent irregular particles, i.e., not spheres, that have excellent properties for polishing, because the more irregular the particle the better the polishing characteristics. The more irregular the particle the more it does not resemble the smooth rounded outer surface of a sphere. In addition, while the irregularity of the particles may vary particle to particle, the process of the present invention provides consistent average irregularity, such that each batch will have consistent polishing characteristics for the sum of the particles used.

The silica sol or colloidal sol of the present invention contains approximately 20% silica by weight, as used in the examples. Of course, the present invention may be used to create silica sols with less or more silica; however, the present invention is most useful for silica sols having 5 to 40% silica, preferably 12 to 30% and more preferably 18 to 24%. As the percentage of silica by weight varies, differences in the consistent quality from batch-to-batch may occur. For example, for silica sols having greater than 33.0% by weight silica, the sol particles may agglomerate and fall out of solution or gel, and for silica sols have less than 5.0% by weight the sole may not be practical for many applications.

More specifically, most users of the silica sol use a 12% salutation while the present invention may easily be formed from 30% or less solutions. The particle applications for the solutions under 15% are limited due to transportation and storage costs. For example, a 24% solution that is later diluted to a 12% solution is half the cost to ship and store. Therefore, as a balance of minimizing transportation and storage costs while maintaining consistent quality and preventing the particles from falling out of the solution under a variety of conditions, e.g., temperature exposure and vibration during shipping and storage and length of time form manufacture), the inventors have found that a range of 18 to 24% preferably 19 to 22% and about 20% as provided in the three examples below provides a good balance. As described below, the particle size and irregularity of the shape may be adjusted through the quantities of the various chemicals used in this process. Generally, the steps employed in the process and the process conditions will remain the same, although as detailed below some minor process variations may be made to enhance the final product of colloidal sol, and provide desired variations to the resulting end product. In addition, some process steps are identified below as allow change in the end product; however, these steps such as rate of addition of TEOS, reactor temperature, temperature of TEOS during addition and others are either difficult to control or have been found to have other undesirable or inconsistent results, and since most adjustments in particle size and obtaining a consistent single peak size distribution have been found to easily occur through variations in the amount of chemicals added, changing process parameters, unless otherwise noted may be undesirable.

The colloidal sol is generally formulated generally in the present invention, by the steps of adding a silica source, such as Silbond® LBEG (a high-purity tetraethyl orthosilicate (TEOS)), to a potassium hydroxide solution ("KOH") at about a pH of 10 with heating. Although the exemplary processes all use TEOS, the process with minor changes, such as reflux temperatures and the chosen solvent can use a silica source other than TEOS, such as a tetraalkyl orthosilicate. Acceptable silica sources as a tetraalkyl orthosilicate include Tetrapropyl orthosilicate (TPOS), Tetraisopropyl orthosilicate (TiPOS), Tetrabutyl orthosiliate (TBOS), tetraethyl orthosilicate (TEOS) and Tetramethyl orthosilicate (TMOS). The solvent used may also relate to the tetraalkyl orthosilicate, such as tetraethyl orthosilicate uses ethanol as a solvent and tetramethyl orthosilicate would use methanol as a solvent if added. Acceptable high-purity tetraethyl orthosilicate generally include all Electronic Grade TEOS. High purity means 99.86% minimum purity. While the present invention will work well with lower grades of purity of TEOS, it is generally preferred to have a purity of greater than 95%, more preferable greater than 97% and for the electronics industry, high purity TEOS as described above. The sol is useful in other industries, such as paint, which typically use 98% purity TEOS. Industries outside of the electronics industry it is acceptable to use a standard grade or technical grade KOH. The process of the present invention hydrolyzes the TEOS to create the silica particles in a solution (a silica sol). The process of hydrolysis of the TEOS generates an ethanol by-product, which is subsequently removed by distillation or an alternate process. At this point in the process, the size of the particles may be different than the desired final particle size, and the sol contains more than one particle size distribution peak. Therefore, the process then adjusts the particle size and forms a single particle size distribution peak. After the particle size is adjusted, the present invention may perform steps related to improving longevity of the sol with the desired performance characteristics.

Figure 2:
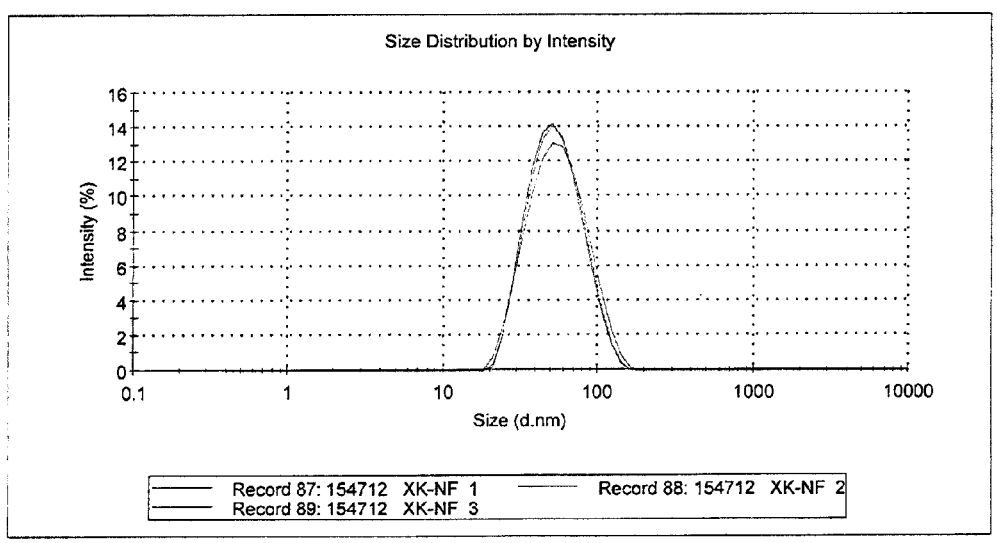
FIG. 2 is a plot showing a single peak of particle size after the adjusting step.
Figure 3:
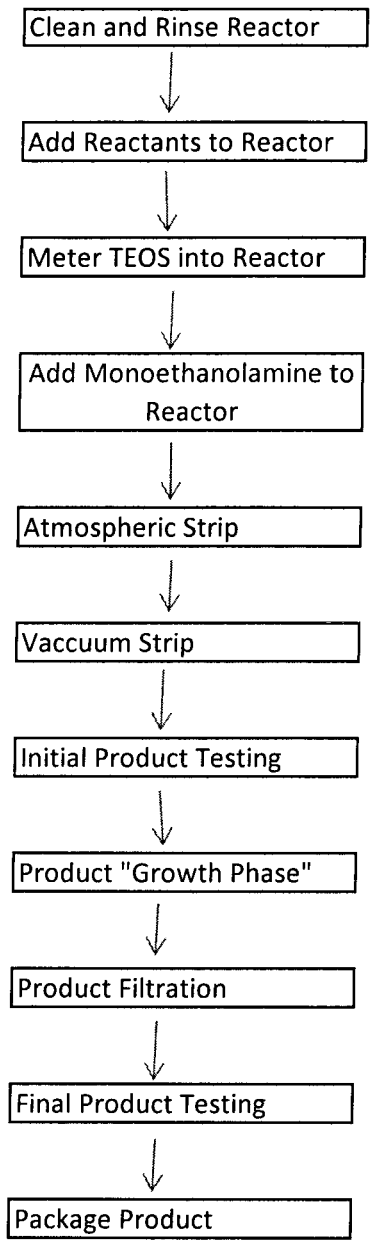
FIG. 3 is a flow diagram.

As illustrated in Table 1 and described below, the process of the present invention may vary where some processes may include intentionally added ethanol, while others do not include intentionally added ethanol. Of course, some ethanol is created from the TEOS during the process but such ethanol is a product of the process and not intentionally added ethanol. Ethanol that is created as part of the process may also be referred to as "created ethanol" to distinguish it from ethanol that is added as part of a process step, also referred to as added or intentionally added ethanol. After removal of the ethanol, whether from the TEOS or intentionally added ethanol, the silica sol remains in the KOH solution, but at this stage of the process the desired particle size for the silica particles typically has not been achieved, and typically includes multiple peaks representing high concentrations of different particle sizes, such as the bimodal peak size distribution illustrated in FIG. 1. To achieve the desired particle size for the silica sol and a single particle size peak such as illustrated in FIG. 2, the size distribution of the particles are adjusted by first lowering the pH from about 6.0 to 7.0, preferably from 6.4 to 6.8 and as illustrated in the examples to 6.6 through the addition of citric acid. If the pH goes too low, flocculation or agglomeration of the particles may occur and if the pH goes too high, the particles may shrink in size or dissolve. The pH is then raised back to 9.5 to 10.5, preferably 9.8-10.2, and as illustrated in the examples to 10.0 through the addition of KOH to ultimately achieve the desired particle size. As used herein, in relation to pH, the term "about" typically means±0.5 pH, and preferably ±0.2 pH, although as noted below sometimes less variation or more variation may be allowed in certain process steps. The example provided below in Table 1 achieves a desired particle size of approximately 450 nm. The KOH is electronic grade, which means impurities such as other metals are low or minimized especially NaOH. While other grades of KOH may be used, trace metals will be higher.

As further noted below, the colloidal sol of the present invention is unique by virtue of its purity with respect to trace metals. For example, many other colloidal silica sols that are used in the electronics industry are derived from lower-purity sources of silica (e.g., fumed silica or sodium silicate) used in colloidal sol. For creating a high purity silica sol that is free from or substantially free form trace metals, fumed silica, or sodium silica should not be used as an input to the process. As a result, the colloidal sol that is the basis of this invention is well suited for applications requiring very high purity as it does not use fumed silica or sodium silicate, or other silicas including undesirable trace metals. As discussed above, while some silica sols do exist that are of high purity, all of them currently have issues with at least one of or obtaining one of long term stability, shape irregularity, particle size distribution, single peak particle size distribution, and particle size growth.

An example of a batch to make a colloidal sol having a particle size of 450 nm is provided below, including in Table 1 the ingredients and respective weights. The process of the present invention may be performed without the use of any undesirable ammonia.

TABLE 1

|  | Input Weights | Accuracy (%) |
| --- | --- | --- |
| Electronic Grade Water | 200.5 kg (442 lbs.) | +/−.45 |
| KOH Electronic Grade, 45.0% | 3.35 kg (7.38 lbs.) | +/−.10 |
| Tetramethylammonium Hydroxide, 25% Aq. | 517.1 g (1.14 lbs.) | +/−.45 |
| Ethanol | 60.24 kg (132.8 lbs.) | +/−.50 |
| high-purity tetraethyl orthosilicate (TEOS) | 114.62 kg (252.7 lbs.) | +/−.40 |
| Monoethanolamine | 99.8 g (0.22 lbs.) | +/−1.0 |
| Citric Acid, 10% Aq. | 13.83 kg (30.5 lbs.) | +/−.50 |
| KOH Electronic Grade, 10% | 8.75 kg (19.3 lbs.) | +/−.50 |
| Hydrogen Peroxide 30% | 793.8 g (1.75 lbs.) | +/−1.0 |

The process may be broken into three basic categories of steps, hydrolysis, distillation and adjusting the particle size.

Hydrolysis

An exemplary hydrolysis procedure includes the following steps for making 450-nm colloidal sol:

1. Charge 200.5 kg (442 lbs.) of Electronic Grade Water into a reactor.

2. Charge 60.24 kg (132.8 lbs.) intentionally added Ethanol into the reactor.

3. Charge 527.1 g (1.14 lbs.) of Tetramethylammonium Hydroxide, 25% Aq. (aqueous) to the reactor.

4. Charge 3.35 kg (7.38 lbs.) of KOH Electronic Grade, 45% solution to the reactor.

5. Mix components 1-4 in the reactor for about 10 minutes.

6. Charge 114.62 kg (252.7 lbs.) of TEOS to a separate holding tank, and maintaining at a temperature of 22° C. to 26° C.

7. Heat the reactor to 78-80° C.

8. Maintain 78-82° C. temperature in the reactor. As the temperature rises during the addition, and it is desirable to keep the temperature at 83° C. or less, the reactor heating is reduced.

9. Start the addition of TEOS (high purity tetraethyl orthosilicate) addition at a rate of 0.635 kg (1.4 lbs.) per minute from the separate feed tank into the reactor until all TEOS has been added. The addition rate may vary depending on batch size, the required time for addition is typically controlled, and for the exemplary batch size the addition rate 0.635 kg per minute, which will equal an addition time of at least 160 minutes, preferable at least a 170 minutes and more preferably, at least 175 minutes. More specifically, it has been determined that 175-185 minutes of addition time and the optimum addition time has been found to be with 180 minutes. Regardless of the batch size, for consistent quality, 180 minutes is preferred as the addition time for delivering the desired amount of TEOS into the reaction. Of course, variations to the addition time may be made, with the effect illustrated in Table 5. The inventors have noted that 60-300 minutes works for the addition of the silica source to the reactor, preferably 120-240 minutes, more preferably 150-200 minutes and even more preferably 160-190 minutes. The 170-190 minutes of addition time is within the range and the best range the inventors have found is 175-185 minutes, with the examples using 180 minutes for addition of the silica source to the reactor.

10. After the addition of TEOS is complete, add a solution of 99.8 g (0.22 lbs.) Monoethanolamine in 200 ml Electronic Grade Water to the reactor.

11. Keep under constant agitation and allow the reactor to cool overnight to ambient temperature.

Distillation

The distillation procedure of the colloidal sol as generally discussed above includes the following more specific steps to remove ethanol and water.

1. Gradually increase the temperature to 78° C. to establish a reflux condition.
2. Atmospheric strip to a column head temperature of 95° C.
3. Before vacuum strip, cool the reactor to 50° C.
4. Start vacuum pump. The initial vacuum should be 610 to 660 mm of Hg.
5. When vacuum is stable, heat the system until a reflux condition occurs.
6. At reflux condition, strip until the column head temperature reaches about 45° C. Near this point, relieve the vacuum.
7. Cool the reactor to room temperature.

Adjusting the Particle Size

The adjustment procedure of the colloidal sol as generally discussed above includes the following more specific steps to obtain 450-nm particles:

1. Meter in a 10% Citric Acid solution into the reactor at 140 g/min until a desired pH, typically a pH of 6.0-7.0, preferably 6.4-6.8, most preferably a pH of 6.60.
2. Circulate the colloidal sol.
3. Meter in a 10% Electronic Grade KOH solution into the reactor at 140 g/min until the pH is 9.5 to 10.5, preferably 9.8 to 10.2 and most preferably 10.0.
4. Circulate the colloidal sol.
5. Charge 793.8 g (1.75 lbs.) of 30% Hydrogen Peroxide into the reactor.
6. Circulate the colloidal sol.
7. Circulate and filter the colloidal sol through one of or a combination of 5-, 3-, 1-, and/or 0.5-micron filters.

As part of the process, not only may the size of the resulting particles be controlled, but also the shape. The particle size is preferably controlled through concentration and/or amount of the KOH and/or amount of ethanol, however, as described below, other steps of the process may be adjusted to change the particle size. An increase in % of KOH results in bigger particles, while a decrease results in smaller particles. As illustrated in Table 2 below, changing only the concentration of KOH, while keeping all other process variables the same substantially changes the particle size.

TABLE 2

The Effect of KOH % Concentration Using Standard Formulation on Nanoparticle Size.

| KOH % | Nanoparticle Size (nm) |
|---|---|
| 0.744 | 310 |
| 0.700 | 210 |
| 0.632 | 450 |

An increase in % of also ethanol results in bigger particles, while a decrease results in smaller particles. The mol ratio of water to TEOS may also be adjusted up or down to create bigger or smaller particles. For example, if more water is used, the particle size is smaller. The temperature of the reactor has also been found to change the particle size, such as a 3-5° C. difference results in noticeable different particle sizes. However, as temperatures can affect other parts of the process, it is preferable to keep temperatures as provided in the example and vary the amount of KOH and/or ethanol to adjust particle size, not temperature. As illustrated in Table 2, the reactor temperature during hydrolysis while keeping all other processes variables the same, will change the particle size.

TABLE 3

Effect of Reactor Temperature during Hydrolysis on Particle Size

| Nanoparticle Size (nm) | Reactor Temp Range (C.) |
|---|---|
| 71.25 | 83+ |
| 64.09 | 78-82 |
| 61.05 | 70-75 |

Please note that while the process generates ethanol (created ethanol) due to the use of TEOS, in the process, which is distilled off, if tetramethyl orthosilicate (TMOS) were instead used, methanol would instead be distilled off. It should be also noted that substantial changes in particle size, such as an increase of at least 200 nm may require more variations than just a single variation of amount of KOH. For example, the amounts of ethanol, KOH and concentration of KOH may be required for large size differences. Generally the step of distilling will distill off the alcohol solvent, whether a created alcohol solvent or an intentionally added alcohol solvent, such a created ethanol or intentionally added ethanol until there is less the 1% by weight of the solvent, of the total weight of the silica sol, preferably less than 0.5%, more preferably less than 0.3%, and even more preferably less than 0.1%. The process may consistently distill of the alcohol solvent to less than 0.03% and even has distilled off the solvent to less than 0.01%. In the step of distilling the alcohol solvent, whether created or intentionally added, is distilled off by stripping to a column head temperature of 15-20 degrees C. above the boiling point of the alcohol solvent. If multiple alcohol solvents are used, either multiple distillation column head temperatures are used, or to a column head temperature of 15-20 degrees C. about the highest column head temperature.

In the adjusting step, the adding of an acid, preferably an organic acid, such as citric acid, creates the single peak particle size distribution, instead of two or more peaks of particle size distribution. While citric acid has been found to work exceptionally well, examples of other organic acids include, but are not limited to, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid. Inorganic acids may also be used, although it has been found preferable to use organic acids. Examples of acceptable inorganic acids include, but are not limited to hydrochloric acid, sulfuric acid, nitric acid, and phosphoric acid. By adding 10% organic acid, such as citric acid, typically drop by drop, the pH may be reduced to 6.4-6.8, and is then left set for a desired time interval. It is then brought back to a pH of 10 with KOH, typically a 10% KOH solution so the volume added may simply equal the volume of organic acid added. Other bases may be used to raise the pH, including but not limited to, sodium hydroxide, copper hydroxides, and various amines; however, acids including certain metals that may be considered impurities, including in some circumstances sodium hydroxide may be avoided. After the addition of the organic acid and the further addition of the base, the bimodal peak distribution of FIG. 1 is gone and the single peak distribution of FIG. 2 remains.

To further stabilize the colloidal sol for long-term storage, such as prevent an increase in particle size, and prevent microbial growth without the use of various biocides, 0.05% hydrogen peroxide is added, as discussed above. The hydrogen peroxide prevents the particles from clumping or growing in size. Use of the hydrogen peroxide allows the colloidal sol to be biocide free.

It should be noted that most electronic grade water has a pH slightly less than 7, but with long-term storage may approach 7. Therefore, the pH of the electronic grade water used should be adjusted for consistency using the KOH.

If no ethanol is added, then smaller particles, such as 60 nm and below are generally produced. As illustrated in Table 1, intentionally added ethanol was used to obtain 450 nm particles. While the process may be used without ethanol being added, it has been found that ethanol being added allows for use of less KOH as a percentage of the total $H_2O$. Therefore, with the addition of ethanol, less KOH is required to make the same particle size. Also, the addition of ethanol is helpful in preventing the sol from gelling quickly or from the particles growing over time. As such, even though intentionally added ethanol, is not needed to make the 60 nm and 70 nm particles in Tables 2 and 3; however, ethanol is added to those processes for the above reasons. Other alcohols may be used instead of ethanol, up to 5 or 6 carbon molecules such as methanol, propanol, butanol, pentanol; however, ethanol has been found to be the most desirable to use in the process for a number of reasons. In addition, ethanol is common and easy to work with.

In regards to the potassium hydroxide or KOH, the amount of KOH is generally referred to as a percentage of the total water ($H_2O$) in the sol. As the concentration of KOH may vary, at least for the first addition of KOH, it has been found that it is the amount of KOH weight percent to the total $H_2O$ that is relevant to grow the particles. The less KOH that is in the solution initially, generally the smaller the particles such that 0.54 weight percent of KOH to the total $H_2O$ weight generally with the other parameters staying the same would grow 42-nm particles. In comparison, 0.63 weight percent of KOH to the total $H_2O$ would grow 70-nm particles. The potassium hydroxide (KOH) used in most processes is a 45% solution. Other hydroxides could be used that are metal hydroxides such as sodium hydroxide and copper hydroxide, however, most industrial uses for silica sols would consider sodium hydroxide undesirable.

The silica particle concentration may also vary. It has been found that the desirable lower limit for silica particle concentration is 5.0 weight percent of the overall formulation and the upper desirable limit to concentration is 32.0 weight percent of the formulation. Typically above 30% weight percent and at times greater than 25% creates additional manufacturing, transportation and storage concerns as the silica particles may be more likely to precipitate out of the silica sol solution. Likewise, as discussed above, a weight percent of 15% or greater reduces storage and transportation costs with no adverse effects.

A 25% aqueous solution of tetramethylammonium hydroxide (TMAH) may be added. While the tetramethylammonium hydroxide is not required and the solution may exclude it, it is typically added in an amount of 0.05 weight percent and up to 0.11 weight percent of the overall formulation. Silica is unique as it has a positive charge and TMAH and KOH supply OH ions which form a barrier around the silica nanoparticles. The barrier layer beneficially prevents positively charged potassium ions from entering the developing Si—O nanoparticle matrix. As the nanoparticle grows, the barrier layer weakens and the potassium ions slow particle growth and finally growth stops. An equilibrium forms in the system. The TMAH also minimizes the potassium ions from being attached to the $SiO_2$ particles, which not only may prevent growth of the particles but also may cause inconsistent polishing characteristics in the electronics industry as the potassium ions increase the scratching while polishing. More specifically, it is believed that the potassium ion from the KOH terminates the $SiO_2$ growth, resulting in smaller particles of $SiO_2$. In addition, it is believed that the TMAH is a surfactant that helps the particles develop, and minimize the potassium ions from entering the $SiO_2$ particles matrix. As illustrated in Table 2, keeping all other process parameters the same, the addition of TMAH increases particle size. In fact, minor amounts of TMAH may grow the particles by over 20%.

TABLE 4

Effect of TMAH Concentration Using Standard Formulation on Nanoparticle Size

| TMAH % | Nanoparticle Size (nm) |
| --- | --- |
| 0 | 59.89 |
| 0.0515 | 72.82 |
| 0.1030 | 89.48 |

In the present invention, generally the minimum ratio of moles of water to moles of TEOS is 11:1 and more preferably 11.64:1. Likewise, the maximum ratio of moles of water to moles of TEOS is preferably 30.0:1 with most formulations having 18-23:1 moles of water to moles of TEOS preferably 19-22:1 and yet more preferably 20-21, and for the exemplary processes, 20.34:1. A 5% solution of monoethanolamine may be added at the end of hydrolysis to stabilize sol and inhibit precipitation and acts as a complexing agent in the silica sol. Likewise, monoethanolamine may improve polishing characteristic of the resulting slurry. Other amines such as diethanolamine and triethanolamine may also be used.

As stated above, other organic acids may be used such as succinic acid, tartaric acid, phthalic acid, acetic acid, and maleic acid in place of the citric acid; however, it has been found that citric acid works well with minimal drawbacks. In general, the addition of an acid, preferably organic acid to cause the change in pH provides the desirable single peak instead of bimodal peak distribution of particle sizes.

The process parameters also may include variations to the provided above process parameters. The TEOS addition time causes a decrease in any given particle size when the addition time is less than 175 minutes. Experimental observation indicates the most uniform reproducibility for a given particle size occurs using a 175 to 185 minutes addition time with 180 minutes most preferred. It has also been found that addition time of greater than 185 minutes results in an increased particle size in any given particle size, and as such the quality of the end product is inconsistent. If the time is limited to one hour, the particles do not have sufficient time to agglomerate and too small or inconsistent particles sizes occur.

The reaction temperature during TEOS addition, if higher than provided, generally results in increased particle size. More specifically, a reactor temperature of more than 83° C. increases the normal standard particle size expected, while 78-82° C. provides generally standard reproducible desired particle sizes anywhere from 40 nm to 500 nm, and 70-75° C. provides decreased particle size from the normal standard particle size expected. More specifically, if the reactor is codex, hydrolysis does not work as well, and as such, a lower temperature would require more KOH thereby increasing costs. The effect of more KOH is a higher reflux of the alcohol, such as ethanol which effects how the particles grow and may introduce some uncertainty. Furthermore, the type of addition technique for TEOS may also vary the results. It is generally preferred that the TEOS be added by a subsurface method to prevent material buildup on the sides of the reactor, which may result with the above-surface method. This buildup on the sides of the reactor reduced effective KOH and reduced particle size.

Variations in the time between the end of the hydrolysis and the initiation of the distillation reaction cause changes in particle sizes. For example, if a delay in the time hydrolysis to strip is only one hour, decreased particle size will result. A time to strip delay of at least 5 hours, preferably at least 10 hours, more preferably at least 12 hours, and as used in the examples 15 hours is a preferred method because particle size variation is minimized. Delaying the time from hydrolysis to distillation to 60 hours increases the particle size. The time delay variation may affect the amount of particle agglomeration.

Table 5 illustrates the change in particle size from changing the time delay between hydrolysis and distillation while maintaining all other process parameters.

TABLE 5

Particle Size Change from Delay between Hydrolysis and Distillation

| Nanoparticle Size (nm) | Time to Strip (hr) | Comment |
| --- | --- | --- |
| 59.0 | 1 | Immediate stripping |
| 78.6 | 15 | Normal delay in stripping |
| 105.0 | 60 | Over weekend delay in stripping |

It has been generally found that grounding of the reactor is desirable for producing standardized particle sizes. Grounding minimizes charge buildup in the reactor near the reactor sides which effects the ions and the growth of the particles. The pH of the electronic grade water may also affect the particle size and therefore, it is desirable to be controlled to a specified particle size. The pH of the water is generally desirable to be in the range of 5.0 to 7.0. A lower pH such as 5.0 to 6.0 generally provides standard particles sizes, such as in the desired range of 1-500 nm with a single peak size distribution; however, particles sizes seem to increase when the pH of electronic grade water is above 7.

All of the above process parameters and method steps, when followed, allow the production of particles seizes ±3 nm consistently while the best current silica sols (even excluding all of the above mentioned drawbacks) have at best, ±10 nm particle size distribution.

A second exemplary batch in Table 6 is provided below to make 210 nm particles in 378.5 liters (100 gallons).

TABLE 6

|  | lbs. | kg. |
| --- | --- | --- |
| Electronic Grade Water | 442 | 200.49 |
| KOH Electronic Grade | 6.86 | 3.11 |

TABLE 6-continued

|  | lbs. | kg. |
| --- | --- | --- |
| 45.0% TetraMethylAmmonium Hydroxide 25% Aq | 0.851 | .386 |
| Ethanol | 66.2 | 30.03 |
| TEOS | 252.7 | 114.62 |
| Monoethanolamine | 0.22 | 0.010 |
| Citric Acid 10% (Citric Acid) | 21.16 | 9.60 |
| KOH Electronic Grade 10% (45.0% KOH EG) | 18.08 | 8.20 |
| Hydrogen Peroxide 30% | 1.75 | 0.79 |

The hydrolysis procedure for the example in Table 6 includes the following more specific steps:

Hydrolysis Procedure

1. Prepare the reactor and turn on refrigeration unit to a set point of about 1.5° C. (35° F.).
2. Charge 200.5 kg (442 lbs.) electronic grade water into reactor.
3. Charge 30.03 kg (66.2 lbs.) of ethanol into reactor.
4. Charge 0.851 lbs. (0.386 kg) tetramethylammonium hydroxide 25% Aq. to reactor.
5. Charge 6.86 lbs. (3.11 kg) 45% EG KOH to reactor.
6. Close the reactor.
7. Monitor temperature and record hourly maximum temperature 20° C.
8. Close reactor vents; start reactor agitator; start reactor circulation pump.
9. Mix reactor for 10 minutes.
10. Take and record a pH reading.
11. Charge 114.62 kg of TEOS to a separate holding tank.
12. Close holding tank vent and pressurize the holding tank with N2.
13. Heat reactor to 78-80° C. The set point for hot oil heater is 110° C. initially. When reactor temperature reaches 73° C., lower the hot oil heater set point to 80° C.
14. Heat the holding tank to 22-26° C. When temperature in the holding tank is 24° C., stop. Close the holding tank valve. The TEOS must be warmed to room temperature or 22-26° C. and should be 22-26° C. during the addition to reactor.
15. Adjust the hot oil heater set point to maintain 78-82° C. temperature in reactor. Do not allow temperature to climb above 83° C.
16. Continue heating reactor to maintain a temperature that should be at 78° C. to start addition of TEOS from the holding tank.
17. Start the TEOS addition through the reactor flow meter at set-point of 0.85 which is 0.635 kg per minute. Meter the TEOS into reactor using a dip tube.
18. Measure the vent temperature to ensure below 20° C.
19. Continue TEOS addition at a 0.85 set point until all of the TEOS is added to reactor, which for the comments listed is approximately 180 minutes.
20. Mix 0.22 lbs. (99.8 g) of monoethanolamine (MEA) with 200 ml (200 g) electronic grade water.
21. After TEOS addition is completed, charge MEA and water mixture into the reactor using $N_2$.
22. Circulate reactor for 10 minutes. Obtain a pH reading from reactor.
23. Allow reactor to cool and agitate overnight.

The stripping (atmospheric and vacuum) procedure includes the following more specific steps:

Stripping (Atmospheric and Vacuum) Procedure

1. Gradually increase the Hot Oil Heater Set Point to establish a reflux condition.

2. At reflux condition, start splitter and set for total take to receiver and cut lites to separate tank.

3. Increase Hot Oil Heater Set Point as needed to maintain reflux.

4. Strip to a head temperature of at least the boiling point of the solvent plus 10-20° C. (for ethanol to a temperature of 95° C.).

5. Atmospheric lites amount is estimated to be about 165.1 kg (364 lbs.). Total lites to be stripped is 170.1-176.9 kg (375-390 lbs.).

6. Before vacuum strip, cool reactor to 50° C.

7. At 50° C., empty separate tank and weigh the atmospheric lites and record the amount.

8. Start vacuum pump and gradually apply vacuum and use caution to minimize excessive boil-up into the column. The initial vacuum should be 610-660 mm Hg (24-26 inches Hg).

9. When vacuum is stable, start heating the oil. Set hot oil set point at 80° C. Monitor reactor to determine when reflux condition occurs.

10. At reflux condition, start splitter and set for total take to receiver and cut lites to separate tank.

11. As lites are removed from reactor, the vacuum will increase to 660-686 mm Hg (26 or 27 inches Hg) and additional heat input may be required.

12. The head temperature will reach about 45° C. under vacuum of about 686 mm Hg (27 inches Hg), and relieve vacuum with $N_2$.

13. Empty separate tank and weigh the lites and record the final amount of lites which should be between about 30-35 lbs. or 13.5 to 16 kg. Continue stripping if vacuum stripped amount is less than 13.6 kg (30 lbs.) or the total lites is not between 170.1-176.9 kg (375-390 lbs.).

14. When the correct amount of lites have been stripped off. Relieve the vacuum with $N_2$ and cool reactor to 30° C.

15. Optionally, obtain a 1 pint sample after vacuum strip and submit to a quality check lab for flashpoint and ethanol percentage of the total weight.

16. Insert reactor pH probe into recirculation line or reactor.

17. Make 9600 g of 10% citric acid solution and meter 10% citric acid solution into reactor at 140 g/min. Stop addition at 6.60 pH. This will take approximately 1 hour.

18. Circulate reactor and record the PH and the amount of 10% citric acid used.

19. Make 8200 g of 10% KOH solution.

20. Meter 10% KOH solution into reactor at 140 g/min. Stop at 10.0 pH. The addition will take approximately 1 hour.

21. Circulate reactor and record the pH and the amount of 10% KOH used.

22. Verify pH with calibrated lab pH meter.

23. Charge 793.8 g (1.75 lbs.) of 30% hydrogen peroxide into the reactor.

24. Circulate reactor for 20 minutes.

25. Optionally, submit the sample to the quality control lab for particle size, solvent (ethanol) percentage, and rapid solids.

26. Set up reactor filter for recirculation and install a 5 micron and a 3 micron filter elements in sequence.

27. Circulate reactor through the reactor filters for 20 minutes while monitoring filter pressure.

28. Set-up for packaging into product containers. Use a 3 micron and a 1 micron filter in reactor filter sequence and a special 0.5 micron in fill line filter during packaging. Replace filters as needed.

29. During packaging obtain a 1 quart sample of filtered product for quality control lab for a composite sample—silica sol Solids %, Flashpoint, KOH %, pH, Specific Gravity, Viscosity, Particle Size, Zeta Potential, and EtOH %.

30. Package at 45 lbs.net in 5-gallon plastic containers.

TABLE 7

| RAW MATERIALS | lbs. | kg. |
| --- | --- | --- |
| Electronic Grade Water | 442 | 200.49 |
| KOH Electronic Grade 45.0% | 7.28 | 3.30 |
| TetraMethylAmmonium Hydroxide 25% Aq | 0.851 | 0.386 |
| Ethanol | 99.3 | 45.0 |
| TEOS | 252.7 | 114.62 |
| Monoethanolamine | 0.22 | 0.10 |
| Citric Acid 10% (Citric Acid) | 21.16 | 9.60 |
| KOH Electronic Grade 10% (45.0% KOH EG) | 18.08 | 8.20 |
| Hydrogen Peroxide 30% | 1.75 | 0.79 |

Table 7 is the ingredients found to form acceptable 310 nm particles using a process similar to that in Table 6.

The present invention as provided above allows a consistent particle size of less than or equal to ±3 nm from the center point of the peak of the size distribution peak from batch to batch which has not been achieved by any other silica sol. Furthermore, the particle distribution peak is usually more concentrated in the present invention as shown by the increased intensity at the center point in FIG. 2, which means that a tighter range in size of particles relative to the center point of the peak of the size distribution exists. Therefore, the present invention allows customers to repeatable receive different batches of high quality silica sol with very precise and accurate performance characteristics relative to a desired performance target.

While the invention has been described in connection with its preferred embodiments it should be recognized that changes and modifications may be made therein without departing from the scope of appended claims.

The invention claimed is:

1. A method of producing a silica sol material, said method comprising the steps of:
   hydrolyzing at least one of tetramethyl orthosilicate (TMOS) and tetraethyl orthosilicate (TEOS) to create a silica sol;
   distilling the silica sol to remove at least one of methanol, ethanol and water; and
   adjusting a particle size of said silica sol to create a single size distribution peak through adjusting the pH of the silica sol from a starting pH of about 9.0 to 11.0 down to a pH of about 6.0 to 7.0 and then raising the pH back up to a pH of about 9.0 to 11.0.

2. The method of claim 1 wherein said step of hydrolyzing occurs at a pH of about 9.5 to 10.5 and wherein said step of adjusting comprises lowers the pH to about 6.0 to 6.9 and then raising the pH to about 9.5 to 10.5.

3. The method of claim 1 wherein said step of hydrolyzing occurs at a pH of about 9.5 to 10.5 and wherein said step of adjusting comprises lowering the pH to 6.4 to 6.8 and then raising the pH to about 9.5 to 10.5.

4. The method of claim 1 wherein said step of hydrolyzing occurs at a pH of about 9.5 to 10.5 and wherein said step of adjusting comprises lowering the pH to 6.6 and then raising the pH to about 9.5 to 10.5.

5. The method of claim 1 wherein said step of hydrolyzing includes adding KOH and wherein said step of adjusting the particle size to create a single size distribution peak through adjusting the pH of the silica sol includes the steps of adding citric acid to lower the pH of the silica sol and then adding KOH to raise the pH of the silica sol.

6. The method of claim 1 wherein said step of hydrolyzing at least one of TMOS and TEOS to create a silica sol further includes the steps of:
adding water to a reactor;
adding ethanol to the reactor;
adding tetramethylammonium hydroxide to the reactor;
adding KOH to the reactor;
mixing the water, ethanol, tetramethylammonium hydroxide and KOH; and
adding at least one of TEOS and TMOS to the reactor over 175-185 minutes and maintaining the reactor at 78-83 degrees C.

7. The method of claim 1 wherein said step of distilling includes the steps of:
increasing the temperature to create a reflux condition in a reactor;
atmospheric stripping to a column head temperature of about 95 degrees C.;
cooling the reactor;
establishing a vacuum of 610-660 mm of Hg;
heating the reactor after establishing a vacuum until a reflux condition is created; and
strip under vacuum.

8. The method of claim 1 wherein said step of adjusting the particle size to create a single size distribution peak through adjusting the pH of the silica sol further includes the steps of:
adding an amount of 10% by weight citric acid solution until reaching a pH of about 6.6;
circulating the silica sol;
adding an amount of a 10% by weight KOH solution until reaching a pH of about 10.0; and
circulating the silica sol.

9. The method of claim 1 wherein said step of adjusting the particle size through adjusting the pH of the silica sol includes adding an organic acid to the silica sol, and wherein a solvent used in the method is selected from the group consisting of methanol, ethanol, propanol, isopropanol, butanol, and pentanol, and said organic acid is selected from the group consisting of succinic acid, tartaric acid, phthalic acid, acetic acid, citric acid, and maleic acid.

10. The method of claim 1 wherein said step of adjusting the particle size through adjusting the pH of the silica sol includes adding an organic acid to the silica sol.

11. The method of claim 10 wherein the organic acid is citric acid.

12. The method of claim 1 wherein said step of hydrolyzing at least one of TMOS and TEOS to create a silica sol further includes the steps of:
adding water to a reactor;
adding tetramethylammonium hydroxide to the reactor;
adding KOH to the reactor;
mixing the water, tetramethylammonium hydroxide and KOH; and
adding at least one of TEOS and TMOS to the reactor over 175-185 minutes and maintaining the reactor at 75-83 degrees C.

13. The method of claim 12 wherein said step of hydrolyzing at least one of TMOS and TEOS to create a silica sol further includes the step of adding monoethanolamine to the reactor after said step of adding at least one of TEOS and TMOS to the reactor.

14. The method of claim 1 further including the step of:
adding hydrogen peroxide after said step of adjusting the particle size to create a single size distribution peak through adjusting the pH of the silica sol.

15. The method of claim 14 further including the step of discharging the silica sol from a reactor into containers through at least one of 5 micron, 3 micron, 1 micron and 0.5 micron filters.

16. A method of producing a silica sol material, said method comprising the steps of:
hydrolyzing a silica source to create a silica sol in a solution of KOH, wherein said silica source is a tetraalkyl orthosilicate, and at a pH of at least 9.0;
distilling the silica sol to remove at least one of a solvent and water; and
adjusting a particle size of said silica sol to create a single size distribution peak through adjusting the pH of the silica sol from a pH of at least 9.0 down to a pH of from about 6.0 to 7.0 and then raising the pH to a pH of at least 9.0.

17. The method of claim 16 wherein said step of hydrolyzing occurs at a pH of about 9.5 to 10.5 and wherein said step of adjusting comprises lowering the pH to about 6.6 and then raising the pH to about 9.5 to 10.5.

18. The method of claim 16 wherein said step of hydrolyzing a silica source to create a silica sol in a solution of KOH further includes the steps of:
adding water to a reactor;
adding said solvent to the reactor;
adding tetramethylammonium hydroxide to the reactor;
adding KOH to the reactor;
mixing the water, said solvent, tetramethylammonium hydroxide and KOH; and
adding said silica source to the reactor over 170-190 minutes and maintaining the reactor in a reflux condition for said solvent.

19. The method of claim 16 wherein said step of adjusting the particle size to create a single size distribution peak through adjusting the pH of the silica sol from a base to an acid and back to a base further includes the steps of:
adding an amount of 10% by weight citric acid solution until reaching a pH of about 6.6;
circulating the silica sol;
adding an amount of a 10% by weight KOH solution until reaching a pH of about 10.0; and
circulating the silica sol.

20. The method of claim 16 wherein the tetraalkyl orthosilicate is selected from the group consisting of Tetrapropyl orthosilicate (TPOS), Tetraisopropyl orthosilicate (TiPOS), Tetrabutyl orthosilicate (TBOS), tetraethyl orthosilicate (TEOS) and Tetramethyl orthosilicate (TMOS).

21. The method of claim 16 wherein said step of distilling the silica sol to remove at least one of a solvent and water further includes the step of atmospheric stripping to a column head temperature of 15-20 degrees C. above the boiling point of said solvent.

22. The method of claim 16 wherein said step of hydrolyzing a silica source to create a silica sol in a solution of KOH further includes the step of adding said silica source to a reactor over 60-300 minutes.

23. The method of claim 22 wherein said step of hydrolyzing a silica source to create a silica sol in a solution of KOH further includes the step of adding said silica source to the reactor over 120-240 minutes.

24. The method of claim 23 wherein said step of hydrolyzing a silica source to create a silica sol in a solution of KOH further includes the step of adding said silica source to the reactor over 150-200 minutes.

25. The method of claim 24 wherein said step of hydrolyzing a silica source to create a silica sol in a solution of KOH further includes the step of adding said silica source to the reactor over 160-190 minutes.

26. The method of claim 16 wherein said step of distilling the silica sol to remove at least one of a solvent and water is performed until less than 1% by weight of said solvent based on a total weight of said silica sol remains.

27. The method of claim 26 wherein said step of distilling the silica sol to remove at least one of a solvent and water is performed until less than 0.5% by weight of said solvent based on said total weight of said silica sol remains.

28. The method of claim 27 wherein said step of distilling the silica sol to remove at least one of a solvent and water is performed until less than 0.3% by weight of said solvent based on said total weight of said silica sol remains.

29. The method of claim 28 wherein said step of distilling the silica sol to remove at least one of a solvent and water is performed until less than 0.1% by weight of said solvent based on said total weight of said silica sol remains.

30. A method of producing a silica sol material, said method comprising the steps of:
hydrolyzing a silica source to create a silica sol in a solution of KOH and a solvent in a reactor, wherein said silica source is a tetraalkyl orthosilicate at a pH of at least 9.0, and wherein said silica source is added to the reactor over a time period of 60-300 minutes;
distilling the silica sol to remove said solvent until less than 1% by weight of said solvent based on a total weight of said silica sol remains; and
adjusting a particle size of said silica sol to create a single size distribution peak through adjusting the pH of the silica sol comprising the steps of:
reducing the pH from a pH of at least 9.0 to a pH of less than 7.0 through addition of an acid; and
increasing the pH from a pH of less than 7.0 to a pH of at least 9.0.

31. The method of claim 30 wherein said step of hydrolyzing a silica source to create a silica sol further includes the steps of:
adding water to a reactor;
adding said solvent to the reactor;
adding tetramethylammonium hydroxide to the reactor;
adding KOH to the reactor;
mixing the water, said solvent, tetramethylammonium hydroxide and KOH; and
adding said silica source to the reactor over 170-190 minutes and maintaining the reactor in a reflux condition for said solvent, and wherein said silica source is only added after said step of adding tetramethylammonium hydroxide.

32. The method of claim 30 wherein the tetraalkyl orthosilicate is selected from the group consisting of Tetrapropyl orthosilicate (TPOS), Tetraisopropyl orthosilicate (TiPOS), Tetrabutyl orthosilicate (TBOS), tetraethyl orthosilicate (TEOS) and Tetramethyl orthosilicate (TMOS).

33. The method of claim 30 wherein said step of hydrolyzing occurs at a pH of about 9.5 to 10.5 and wherein said step reducing the pH reduces the pH from at least 9.0 to a pH of 6.4-6.8, and wherein said step of increasing the pH increases the pH from less than 7.0 to a pH of 9.5-11.

34. The method of claim 33 wherein said step of reducing the pH includes adding an organic acid, selected from the group consisting of succinic acid, tartaric acid, phthalic acid, acetic acid, citric acid, and maleic acid to said silica sol, and wherein said solvent is selected from the group consisting of methanol, ethanol, propanol, isopropanol, butanol, and pentanol.

35. The method of claim 30 wherein said step of distilling the silica sol to remove at least one of a solvent and water further includes the step of atmospheric stripping to a column head temperature of 15-20 degrees C. above the boiling point of said solvent, until less than 1% by weight of said solvent based on said total weight of said silica sol remains.

36. The method of claim 35 wherein said step of distilling the silica sol to remove at least one of a solvent and water is performed until less than 0.1% by weight of said solvent based on said total weight of said silica sol remains.

* * * * *